Patented Sept. 17, 1935

2,014,512

UNITED STATES PATENT OFFICE 2,014,512

PRODUCTION OF CARBAMATES AND CONVERSION PRODUCT OF THE SAME

Alfred Stock, Karlsruhe, Germany, assignor to I. G. Farbenindustrie Aktiengesellschaft, Frankfort-on-the-Main, Germany, a corporation of Germany No Drawing. Application October 18, 1929, Serial No. 400,740. In Germany October 24, 1928

2 Claims. (Cl. 260—112)

The present invention relates to the production of carbamates and conversion products of the same.

I have found that carbamates or products containing carbamates, which are soluble in liquid ammonia only with difficulty, are obtained from metal salts by treating the latter, dissolved in liquid ammonia, with carbon dioxide or gases containing carbon dioxide. It is preferable to employ the carbon dioxide, or the gas mixture containing the same, in excess over the amount theoretically required. In many cases it is satisfactory to work at about room temperature, no heating being required as a rule, and it is advantageous to lead away the heat produced during the reaction by, preferably continuous, cooling. In the carrying out of this reaction, metal salts containing water as well as anhydrous salts may be employed. In order to increase the solubility of the salts to be converted in the liquid ammonia, subordinate quantities of water, for example up to 10 per cent, and preferably not more than 5 per cent, by volume (with reference to the liquid ammonia) may be added to the liquid ammonia. Other substances which increase the solubility of the initial salts may be added to the liquid ammonia instead of or in addition to water. For example it is advantageous to employ a solution of ammonium nitrate in liquid ammonia, as for example of the nature of Diver's liquid (see for example Proc. Roy. Soc. London, vol. 21, page 109 and Phil. Trans. Roy. Soc. London, vol. 163 (1873), pages 359/377).

The carbamates obtained can be readily converted into other compounds by heating or by any other known and suitable method of treatment. Thus for example by simple heating or by treatment with water or steam, preferably while hot, carbonic acid salts may be obtained from the carbamates. By the choice of the quantities of water employed it is possible to produce either carbonates or bicarbonates. The carbonic acid salts may be converted into the corresponding oxides by further heating. Ammonia may be employed instead of water in many cases, and in this way by heating, urea is produced. Again, by carefully heating the carbamates of the alkaline earth metals to red heat, the cyanamides of the alkaline earth metals may be obtained. Or the carbamates can be converted into cyanates by heating and the latter salts can be reduced, for example by means of carbon monoxide, carbon or metals, into cyanides.

The following examples will further illustrate the nature of this invention but the invention is not restricted to these examples. The parts are by weight, except when otherwise specified. When both parts by weight and parts by volume are referred to, these stand in the relation of kilograms and liters, or metric tons and cubic meters, respectively.

Example 1

58 parts of common salt are introduced into 2,000 parts by volume of liquid ammonia which are in a cylindrical pressure tight vessel, around the outside of which water is trickling, and then 50 parts of carbon dioxide are slowly pressed in at about room temperature. After about one hour the excess ammonia together with the ammonium chloride and ammonium carbamate dissolved therein are separated from the sodium carbamate formed by means of a glass filter which is tightly placed over the bottom of the pressure tight vessel. The sodium carbamate may be washed with pure liquid ammonia for the purpose of purifying it. The yield of sodium carbamate is practically quantitative with reference to the quantity of sodium compound employed.

Other salts for example potassium or calcium salts may be employed instead of the sodium chloride. For example by employing 101 parts of potassium nitrate instead of the sodium chloride, potassium carbamate is obtained in a yield which is 95 per cent of the theoretical yield. By employing 164 parts of anhydrous calcium nitrate and 100 parts of carbon dioxide calcium carbamate is obtained in an almost quantitative yield.

Example 2

208 parts of barium chloride are dissolved in 2000 parts by volume of a liquid consisting of about equal parts by weight of ammonium nitrate and liquid ammonia. 100 parts of carbon dioxide are slowly introduced into this solution and the whole is then allowed to stand for about an hour. The precipitate which is separated from the liquid is washed with pure liquid ammonia and constitutes barium carbamate of a high degree of purity.

Example 3

101 parts of potassium nitrate are converted into potassium carbamate in a pressure tight vessel in which there are 2000 parts by volume of liquid ammonia, by pressing in 50 parts of carbon dioxide at about room temperature. The carbamate formed is washed well with liquid ammonia and is converted into potassium bicarbonate by warming to a temperature of about 50° centigrade with 18 parts of water. If only 9 parts of the water are employed for the conversion of the carbamate and the whole is heated to 250° centigrade, potassium carbonate is obtained instead of the bicarbonate. The carbamate can also be further worked up in the manner described above.

*Example 4*

331 parts of lead nitrate are treated with 100 parts of carbon dioxide in the manner described in Example 1. The carbamate obtained which may contain some ammoniate is dissolved in water after washing well with liquid ammonia. Lead carbonate is obtained in excellent yields by heating this solution, and this may be converted, if desired, into the oxide by heating in any known and suitable manner or the carbamate can be worked further in a manner as described above.

*Example 5*

111 parts of anhydrous or 220 parts of crystallized calcium chloride which are deliquesced with a little water are dissolved in 2000 parts by volume of a liquid, consisting of ammonium nitrate and liquid ammonia (Diver's liquid), and the solution obtained is treated with 100 parts of carbon dioxide. The precipitate formed is separated off and washed with liquid ammonia. The calcium carbamate thus obtained is then heated to red heat, and in this manner is converted into calcium cyanamide. Instead of ammonium nitrate, ammonium acetate can be employed.

*Example 6*

160 parts of calcium nitrate are dissolved in 2000 parts by volume of liquid ammonia containing 5 per cent by volume of water and treated with 100 parts of carbon dioxide as described in Example 1. Calcium carbamate is obtained in a yield of 95 per cent of the theoretical yield and this salt can be further worked up as described in Example 5.

*Example 7*

75 parts of pulverulent potassium chloride are treated in the manner described in Example 1 but at a temperature of about 50° centigrade. The potassium chloride is partly dissolved and partly finely suspended at the beginning of the reaction during which stirring is applied. After the reaction potassium carbamate is obtained in a yield of about 90 per cent of the theoretical yield and this salt can be further worked up if desired in the manner described above.

*Example 8*

150 parts of anhydrous or 250 parts of crystallized magnesium nitrate are dissolved in 3000 parts by volume of liquid ammonia and 90 parts of carbon dioxide are pressed in. Magnesium carbamate which in some cases is mixed with double compounds of magnesium carbamate and ammonium carbamate, is precipitated.

Instead of with magnesium nitrate, the process may also be carried out with 210 parts of strontium nitrate, or with 190 parts of anhydrous or 245 parts of crystallized copper nitrate, or with 190 parts of anhydrous or 300 parts of crystallized zinc nitrate, or with 180 parts of anhydrous or 285 parts of crystallized manganese nitrate, or with 185 parts of anhydrous or 290 parts of crystallized nickel nitrate, or with 340 parts of silver nitrate. After pressing in the carbon dioxide, the corresponding carbamate is precipitated in each case in a good yield, sometimes in a form containing ammonia of crystallization.

What I claim is:—

1. The process of producing sodium carbamate which comprises acting on a sodium salt, dissolved in liquid ammonia containing ammonium nitrate and at the most 10 per cent of water, with carbon dioxide.

2. The process of producing sodium carbamate which comprises acting on a sodium salt, dissolved in liquid ammonia containing ammonium nitrate, and at the most 10 per cent of water, with carbon dioxide, while cooling at least to room temperature.

ALFRED STOCK.